(No Model.)

L. N. LUSK.
DETACHABLE BAIL AND EAR THEREFOR.

No. 443,100. Patented Dec. 23, 1890.

Witnesses:
Walter S. Wood
Belle E. Freeman

Inventor.
Lewis N. Lusk
By Lucius C. West
Att'y.

UNITED STATES PATENT OFFICE.

LEWIS N. LUSK, OF KALAMAZOO, MICHIGAN.

DETACHABLE BAIL AND EAR THEREFOR.

SPECIFICATION forming part of Letters Patent No. 443,100, dated December 23, 1890.

Application filed May 1, 1890. Serial No. 350,159. (No model.)

*To all whom it may concern:*

Be it known that I, LEWIS N. LUSK, a citizen of the United States, residing at Kalamazoo, county of Kalamazoo, State of Michigan, have invented a new and useful Detachable Bail and Ear, of which the following is a specification.

This invention has for its object the below described and claimed construction of detachable bails and bail-ears for pails, jars, or other classes of vessels.

Figure 1:
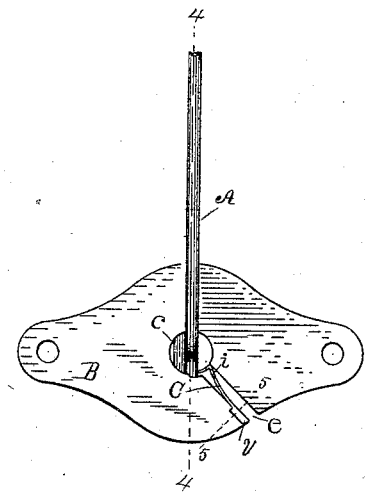
Figure 2:
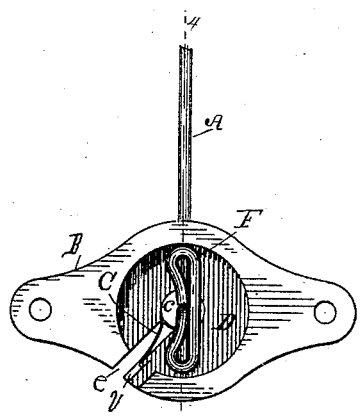
Figure 3:
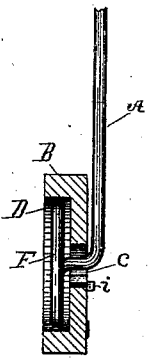
Figure 4:
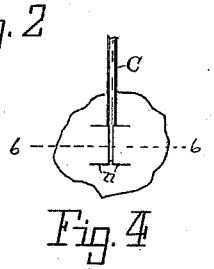
Figure 5:
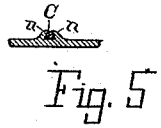

In the drawings forming a part of this specification, Figure 1 is an elevation. Fig. 2 is an inverted view of Fig. 1. Fig. 3 is a section on lines 4 4 in Figs. 1 and 2. Fig. 4 is a plan showing changes. Fig. 5 is a sectional view on line 6 6 in Fig. 4, and Fig. 6 is a section on line 5 5 in Fig. 1.

Referring to the lettered parts of the drawings, B is a bail-ear having a central hole $c$ and a chambered-out portion D on the back side, as shown in Figs. 2 and 3. The ear B is provided with a passage $e$, leading from the central hole $c$ to the outer surface at an angle obliquely to a vertical angle, as shown in Figs. 1 and 2. The inner end of this passage $e$ is closed by a stop-spring C, said spring having an angled end of a length corresponding to the width of said passage or opening $e$.

Figure 6:
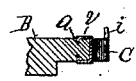

Figs. 1, 2, and 6 show how the spring C may be attached to the ear B, the flanges $a$ of the angled end $v$ of said springs being inserted in channels in the faces of the ear B, as more particularly shown in Fig. 6.

A is one end of the bail, which is attached to the ear. Of course both ends of the bail are alike, but only one end is here shown, the balance of the bail being broken away. The ends of the bail A, which are attached to the ears B, are turned at right angles through the holes $c$ of said ears, said ends terminating in a T-head F, the upper portion of which head contacts with the internal periphery of the chambered-out portion D of the ear B, said upper portion being of a length to prevent the right-angled end of the bail from contacting with the surface of the holes $c$, as illustrated in Fig. 2, and more particularly shown in Fig. 3. The object of this feature of the construction is to prevent the right-angled ends of the bail A of unduly wearing the internal periphery of the holes $c$.

In Figs. 1 and 3 the stop-spring C is provided with a handle $i$, whereby the operator may spring said spring laterally, so as to admit of the passage of the angled ends of the bail A out through the passage $e$, and thereby detach the bail from the ears B.

When attaching the bail A to the ears, their angled ends are passed into the passage $e$ and on into the central holes $c$ of the ears B, the stop-springs C of course yielding laterally to admit of said attachment of the ends of the bail.

The construction in Figs. 1, 2, and 3 is adapted for attaching to any class of vessels—such as wooden pails and the like—in which the ears are constructed separately from the vessel and attached thereto, but these ears may be employed in connection with glass or earthen jars in which the ears may or may not form an integral part of their construction.

In Figs. 4 and 5 is shown a construction which may be adopted for attaching the spring C to the vessel or ear, in which case ribs $n\ n$, having a dovetail recess between them are formed upon the vessel or ear, whereby the end of the stop-spring C can be inserted between said ribs.

Having thus described my invention, what I claim as new, and desire to secure by Letters Patent of the United States, is—

1. The combination of the ears having the central holes, the chambered portions on the back, the passages through which the ends of the bail pass in attaching it and detaching it from the vessel, stop-springs in said passages, and a bail having the angled ends and heads, substantially as set forth.

2. The combination of the ears having the central holes, chambered portions on the back, the passages, the springs in said passages, and the bail having the angled ends provided with the heads, said heads being of a length to engage the internal periphery of said chambered portions, substantially as set forth.

In testimony of the foregoing I have hereunto subscribed my name in presence of two witnesses.

LEWIS N. LUSK.

Witnesses:
MOSES DOYLE,
H. J. FREEMAN.